United States Patent [19]

Nakamura et al.

[11] Patent Number: 5,585,620

[45] Date of Patent: Dec. 17, 1996

[54] IMAGE SIGNAL RESOLUTION CHANGING SYSTEM

[75] Inventors: Yasunori Nakamura, Tokyo; Souichi Ueta, Kanagawa-ken, both of Japan

[73] Assignee: Nikon Corporation, Tokyo, Japan

[21] Appl. No.: 353,292

[22] Filed: Dec. 5, 1994

[30] Foreign Application Priority Data

Dec. 6, 1993 [JP] Japan .................................. 5-339717
Aug. 24, 1994 [JP] Japan .................................. 6-222626

[51] Int. Cl.$^6$ .................................................. H01J 40/14
[52] U.S. Cl. ........................................ 250/208.1; 348/294
[58] Field of Search ..................... 250/208.1; 358/447, 358/451, 445; 348/240, 322, 294

[56] References Cited

U.S. PATENT DOCUMENTS

| | | |
|---|---|---|
| 4,656,525 | 4/1987 | Norris . |
| 4,694,316 | 9/1987 | Chabbal . |
| 4,712,141 | 12/1987 | Tomohisa et al. . |
| 4,771,333 | 9/1988 | Michaels . |
| 4,905,095 | 2/1990 | Yamada .................... 358/451 |
| 5,057,923 | 10/1991 | Matsuda .................... 348/240 |
| 5,214,717 | 5/1993 | Kimura et al. . |
| 5,221,976 | 6/1993 | Dash et al. . |

Primary Examiner—Georgia Y. Epps
Assistant Examiner—Jacqueline M. Steady
Attorney, Agent, or Firm—Oliff & Berridge

[57] ABSTRACT

An image reading device (image scanner) includes a resolution changing device that changes a resolution of the image signals output by a photoelectric sensor device by changing a primary scanning direction aperture size, a secondary scanning direction aperture size, or both, of the photoelectric sensor device. In order to change a resolution in the secondary scanning direction, the secondary scanning direction aperture size is changed, for example, by a control device that controls a drive velocity of a drive device that drives the photoelectric sensor device in the secondary scanning direction relative to an original document. Alternatively, the control device can control a duration of an integral time of the photoelectric sensor device during which the photoelectric sensor elements of the photoelectric sensor device collect light from the original document in order to vary the secondary scanning direction aperture size. In order to change a resolution in the primary scanning direction, the primary scanning direction aperture size is changed, for example, by an averaging process circuit that averages the signals output from a plurality of adjacent photoelectric sensor elements. The averaging process circuit changes a resolution of the image by a factor of m by averaging the signals output by m adjacent photoelectric sensor elements, wherein m is an integer.

23 Claims, 8 Drawing Sheets

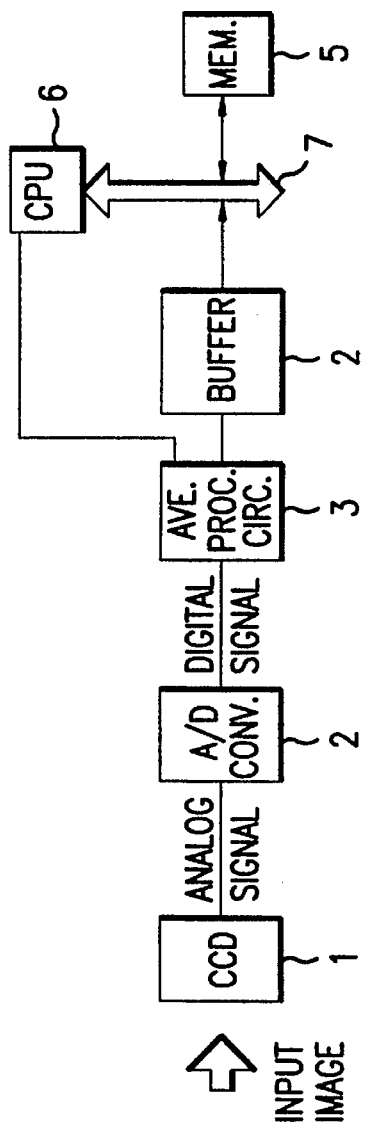
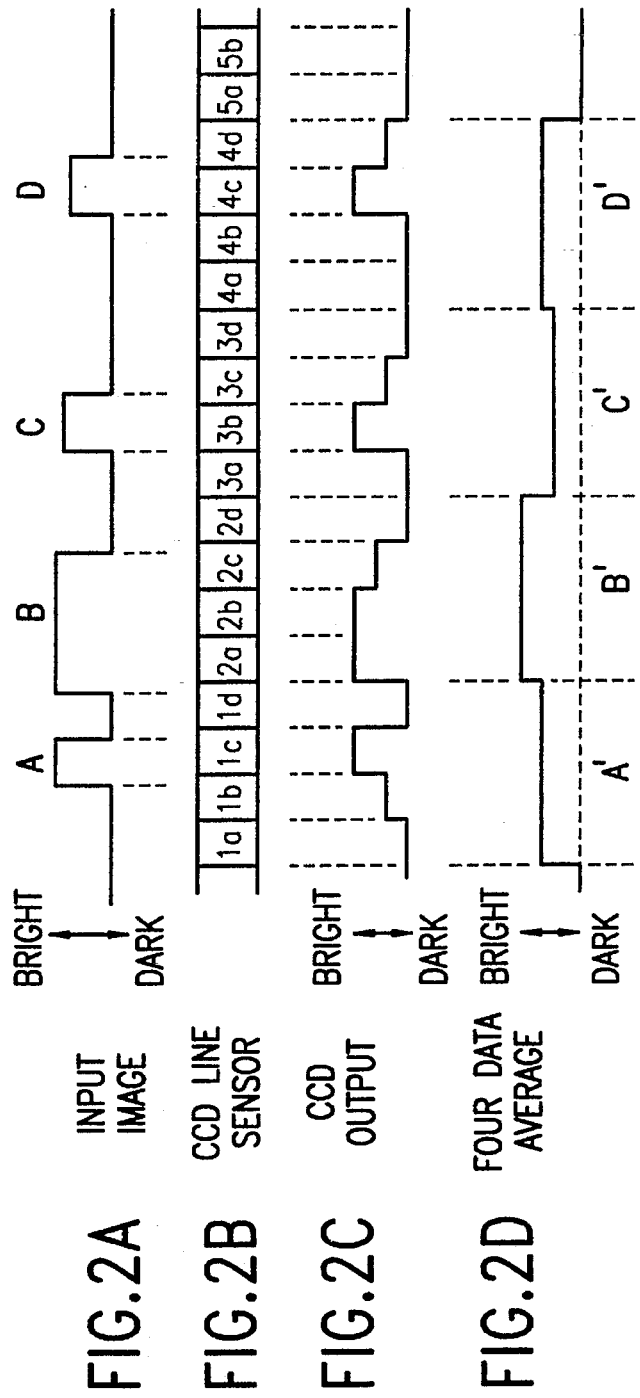

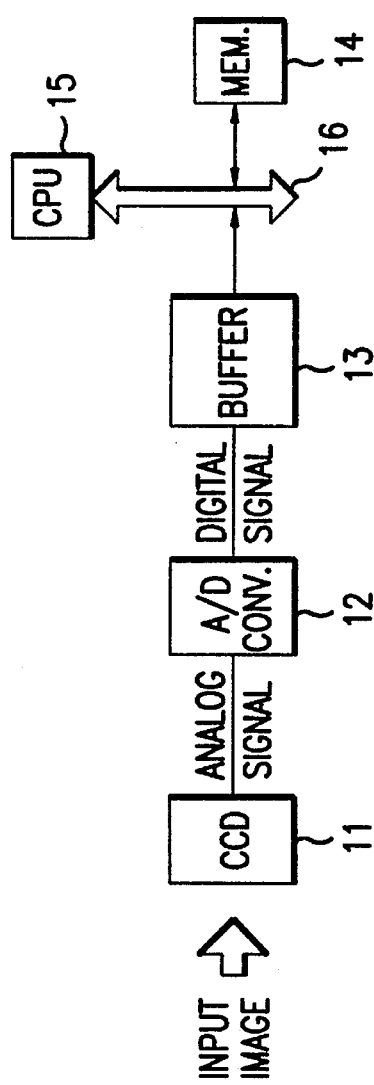
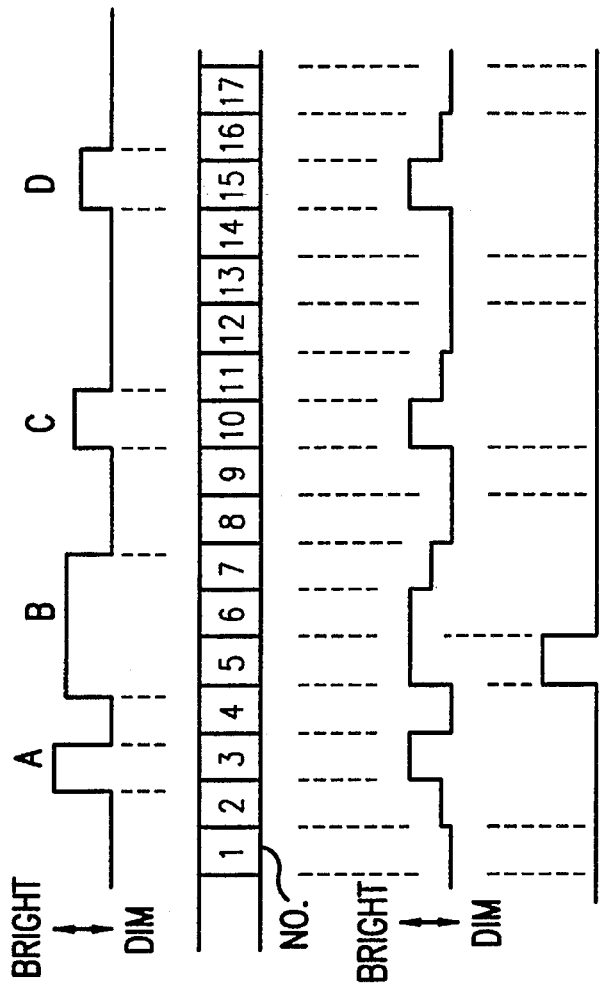
FIG. 5 PRIOR ART
FIG. 6A PRIOR ART — INPUT IMAGE
FIG. 6B PRIOR ART — CCD LINE SENSOR
FIG. 6C PRIOR ART — CCD OUTPUT
FIG. 6D PRIOR ART — DATA AFTER 1/4 THINNING

IMAGE SIGNAL RESOLUTION CHANGING SYSTEM

BACKGROUND OF THE INVENTION

1. Field of the Invention

The present invention relates to an image signal resolution changing system that changes the resolution of image signals read by an image reading device or the like.

2. Description of Related Art

An example of an image input unit in one type of a conventional image input system is shown in FIG. 5. Light passes through or is reflected from an original document so that the light contains image information. As shown in FIG. 5, the input light image is received by a CCD line sensor 11, which performs photoelectric conversion of the light image such that the CCD line sensor 11 outputs electrical (analog) signals. Typically, the CCD line sensor 11 includes a line of photoelectric conversion elements extending in a primary scanning direction, whereby the CCD line sensor 11 outputs data one line at a time. The CCD line sensor 11 and the original document move relative to each other in the secondary scanning direction so that successive lines of data are output, representing the entire original document. Following this, the signals are digitized by an A/D converter 12, which outputs, for example, an 8-bit signal for each photoelectric sensor element. The digital image signals output by A/D converter 12 are temporarily stored in a buffer 13 (FIFO memory). The image signals that are stored in the buffer 13 are sent to a memory 14 via a bus line 16, the sending of the signals to the memory 14 being controlled by commands from the CPU 15.

With this kind of system, an image signal with the maximum resolution is achieved when all data (image signals) output from all photoelectric conversion elements in the CCD line sensor 11 are used. However, when a resolution less than the maximum resolution is to be obtained, the image signals output from the CCD line sensor 11 are thinned out. An example of thinning out is shown in FIGS. 6A–6D. FIGS. 6A–6D show an example of changing the resolution by a factor of 4. As shown in FIGS. 6A–6D, a resolution one-fourth the maximum resolution is realized by using the data (image signals) output by every fourth one of the photoelectric conversion elements in the CCD line sensor 11. That is to say, thinning out is accomplished by using only the data (image signals) from pixels (i.e., from photoelectric conversion elements) having a pixel number of the form 1+4n (n comprising an integer) in FIGS. 6A–6D. In order to realize a resolution one-half the maximum resolution, in a case which is not shown in the figure, thinning out would be similarly accomplished using only the data (image signals) from pixels having a pixel number of the form 1+2n (n comprising an integer) in the figure.

FIG. 6A illustrates an image comprised of four distinct light lines a, b, c and d. FIG. 6B shows the individual photoelectric conversion elements in the CCD line sensor 11. FIG. 6C shows the output of each photoelectric conversion element at maximum resolution. FIG. 6D shows the data resulting from the FIG. 6C CCD output after a ¼ thinning process. With the conventional simple thinning out process shown in FIGS. 6A–6D, the problem exists that some input image light lines received by the CCD pixels are not reflected at all in the output. In other words, even though four slit light lines a, b, c and d (see FIG. 6A) exist in the input image, the data (image signals) corresponding to slit light lines a, c, and d are lost. Consequently, an image signal that is unlike the input image light lines is obtained.

Thus, there is a need for a system and method for reducing the resolution without losing useful image data.

The previous example demonstrated problems associated with conventional resolution reducing operations in which the resolution was reduced in the primary scanning direction. It also is known to reduce the resolution in the secondary scanning direction using a thinning process.

As detailed above, when reading-in the original document, movement is accomplished in the secondary scanning direction by means of a stepping motor, which moves the CCD line sensor 11, the original document, or both in the secondary scanning direction. After reading-in one line of data in the primary scanning direction, movement is accomplished in the secondary scanning direction, and then another line of data is read. This process repeats until the entire image is read.

FIG. 10 illustrates an example in which the resolution in the secondary scanning direction is reduced to one-fourth that of the maximum resolution. In FIG. 10, each item 1A–4D represents a line of data output by the CCD line sensor. That is, due to primary scanning direction scanning, a first line of data 1A is produced. Then, after relative movement in the secondary scanning direction, a second line of data 1B is output. This successive scanning and movement continues until the entire image is read.

With the simple thinning process accomplished in accordance with the prior art, and as shown in FIG. 10, the data from only one in every four lines of data is used. Accordingly, the input image data from a line that has not been used causes a problem in that there is absolutely nothing which is reflected back to the output signal. In other words, when the output of the CCD line sensor is comprised of lines 1A, 2A, 3A, . . . and when the output of the CCD line sensor is read-in in a proportion of one time per four steps, then there is the problem that the picture image input within the lines 1B, 1C, 1D, 2B, 2C, 2D, . . . etc. is ignored.

SUMMARY OF THE INVENTION

It is an object of the present invention to prevent the loss of input image data even when the resolution is decreased, and to conduct high speed (real time) changing of the resolution, preferably using hardware processing.

It is an object of the present invention to prevent such loss of input image data whether the resolution is changed in the primary scanning direction, the secondary scanning direction, or in both scanning directions.

In order to achieve the above and other objects, and to overcome the deficiencies of previous devices, an image reading device (image scanner) includes a resolution changing device that changes a resolution of the image signals output by a photoelectric sensor device by changing at least one of a primary scanning direction aperture size and a secondary scanning direction aperture size of the photoelectric sensor device. The photoelectric sensor device includes a series of photoelectric sensor elements that output image signals based on an amount of light received by the photoelectric sensor elements. The photoelectric sensor device has a primary scanning direction aperture size extending in a primary scanning direction, and a secondary scanning direction aperture size extending in a secondary scanning direction, the primary scanning direction being substantially perpendicular to the secondary scanning direction.

Typically, the image reading device includes a drive device that drives the photoelectric sensor device in the secondary scanning direction relative to an original document. In order to change a resolution of the image signals output by the photoelectric sensor device in the secondary scanning direction, the secondary scanning direction aperture size is changed. The secondary scanning direction aperture size can be changed by a control device that controls a drive velocity of the drive device in order to vary the secondary scanning direction aperture size. Alternatively, the control device can control a duration of an integral time of the photoelectric sensor device during which the photoelectric sensor elements collect light from the original document in order to vary the secondary scanning direction aperture size. Preferably, the control device varies both the drive velocity and the integral time in order to vary the resolution in the secondary scanning direction.

A memory can be provided to store predetermined relationships between resolutions and drive velocities. In such a case, the control device selects one of the drive velocities stored in the memory based upon a selected resolution, and controls the duration of the integral time based on the selected drive velocity and the selected resolution.

With an image scanner constructed in the manner described above, by making the aperture size of the photoelectric sensor device variable in the secondary scanning direction, even when the resolution in the secondary scanning direction is changed to a lower resolution, the pixel input of the entire secondary scanning direction can be reflected in the output.

In order to change a resolution of the image signals output by the photoelectric sensor device in the primary scanning direction, the primary scanning direction aperture size is changed. The primary scanning direction aperture size can be changed by an averaging process circuit that averages the signals output from a plurality of adjacent photoelectric sensor elements in the photoelectric sensor device. The averaging process circuit changes a resolution of the image by a factor of m by averaging the signals output by m adjacent photoelectric sensor elements, wherein m is an integer.

In order to change the primary scanning direction resolution by a factor of two, the averaging process circuit includes a two-level shift register into which an integer number n of bits can be input in parallel. The n bits are shifted from a first level of the two-level shift register to a second level of the two-level shift register. The averaging process circuit also includes a digital adding unit that adds the bits in the first level with the bits in the second level, to output a signal, a first n bits of which is a low resolution output image signal.

In order to change the primary scanning direction resolution by a factor of four, the averaging process circuit includes a four-level shift register into which an integer number n of bits can be input in parallel. The n bits are shifted from a first level of the four-level shift register to a second level of the four-level shift register, then to a third level of the four-level shift register, and then to a fourth level of the four-level shift register. The averaging process circuit also includes two first digital adding units, one of which adds the bits in two of the four levels to produce one first level n bit output signal, another of which adds the bits in another two of the four levels to produce another first level n bit output signal. A second digital adding unit adds the n-bit first level output signals of the two first digital adding units, to output a signal, a first n bits of which is a low resolution output image signal.

In general, in order to change the primary scanning direction resolution by a factor of m, the averaging process circuit includes an m-level shift register into which an integer number n of bits can be input in parallel, m being an integer. The n bits are shifted between m-levels of the m-level shift register. The averaging process circuit includes m/2 first digital adding units, each of which adds the bits of two of the m levels, each producing a first level n-bit output signal; m/4 second digital adding units, each of which adds the n-bit first level output signals of two of the first digital adding units, each producing a second level n-bit output signal. Additional levels of the digital adding units are provided and receive the second level output signals to produce additional level n-bit output signals that are provided to further level digital adding units until a single $\log_2 m$-th digital adding unit is provided. The $\log_2 m$-th digital adding unit adds the n-bit output of two preceding digital adding units, to output a signal, a first n bits of which is a low resolution output image signal.

With an image signal primary scanning direction resolution changing system having the described structure, the average of data output from a number (m) of adjacent photoelectric sensor elements, wherein m is the resolution reduction factor, is obtained using digital adding units and a multi-level shift register (e.g., comprised of D-type flip-flops). Consequently, input image data is not lost even when the resolution decreases, while high speed (real time) resolution changing is enabled by realizing processing with hardware.

BRIEF DESCRIPTION OF THE DRAWINGS

The invention will be described in conjunction with the following drawings in which like reference numerals designate like elements and wherein:

FIG. 1 is a block diagram showing a basic embodiment of an image signal resolution changing system of the present invention;

FIGS. 2A–2D are waveform diagrams used to explain the actions of the embodiment of an image signal resolution changing system of the present invention;

FIG. 5 is a block diagram showing an example of a conventional image signal resolution changing system;

FIGS. 6A–6D are waveform diagrams used to explain the actions of the FIG. 5 conventional image signal resolution changing system;

DETAILED DESCRIPTION OF PREFERRED EMBODIMENTS

Figure 3:
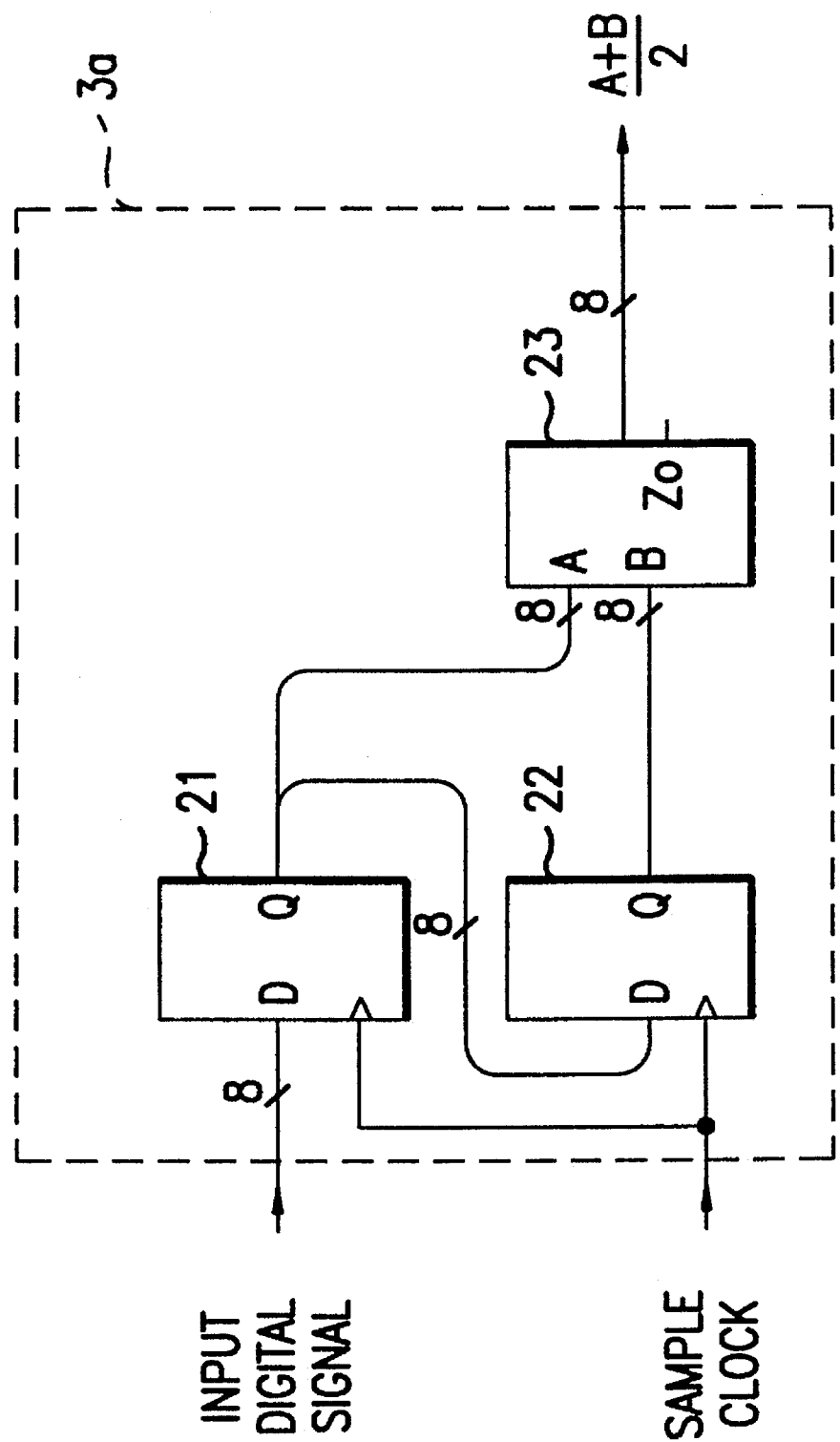
FIG. 3 is a block diagram showing an embodiment of an image signal resolution changing system of the present invention that reduces the resolution in the primary scanning direction by a factor of two.

Embodiments of the present invention will be explained hereafter, with reference to the drawings.

FIG. 1 is a block diagram showing an embodiment of an image signal resolution changing system according to the present invention. The FIG. 1 system changes the resolution in the primary scanning direction.

In FIG. 1, input image light lines that reach the CCD line sensor 1 by passing through or being reflected from an original document undergo photoelectric conversion in the CCD line sensor 1 to become electrical (analog) signals. The analog signals are digitized by an A/D (analog-to-digital) converter 2, and are supplied to an averaging process circuit 3. A/D converter 2 converts the analog signal output by each photoelectric conversion element into an 8-bit digital image signal. Details of the averaging process circuit 3 will be described hereafter with reference to both FIGS. 3 and 4. Image signals that have been averaged by the averaging process circuit 3 are temporarily stored in a buffer 4, and then are sent to a memory 5 via a bus line 7, the transmission being controlled by commands from the CPU 6.

Figure 4:
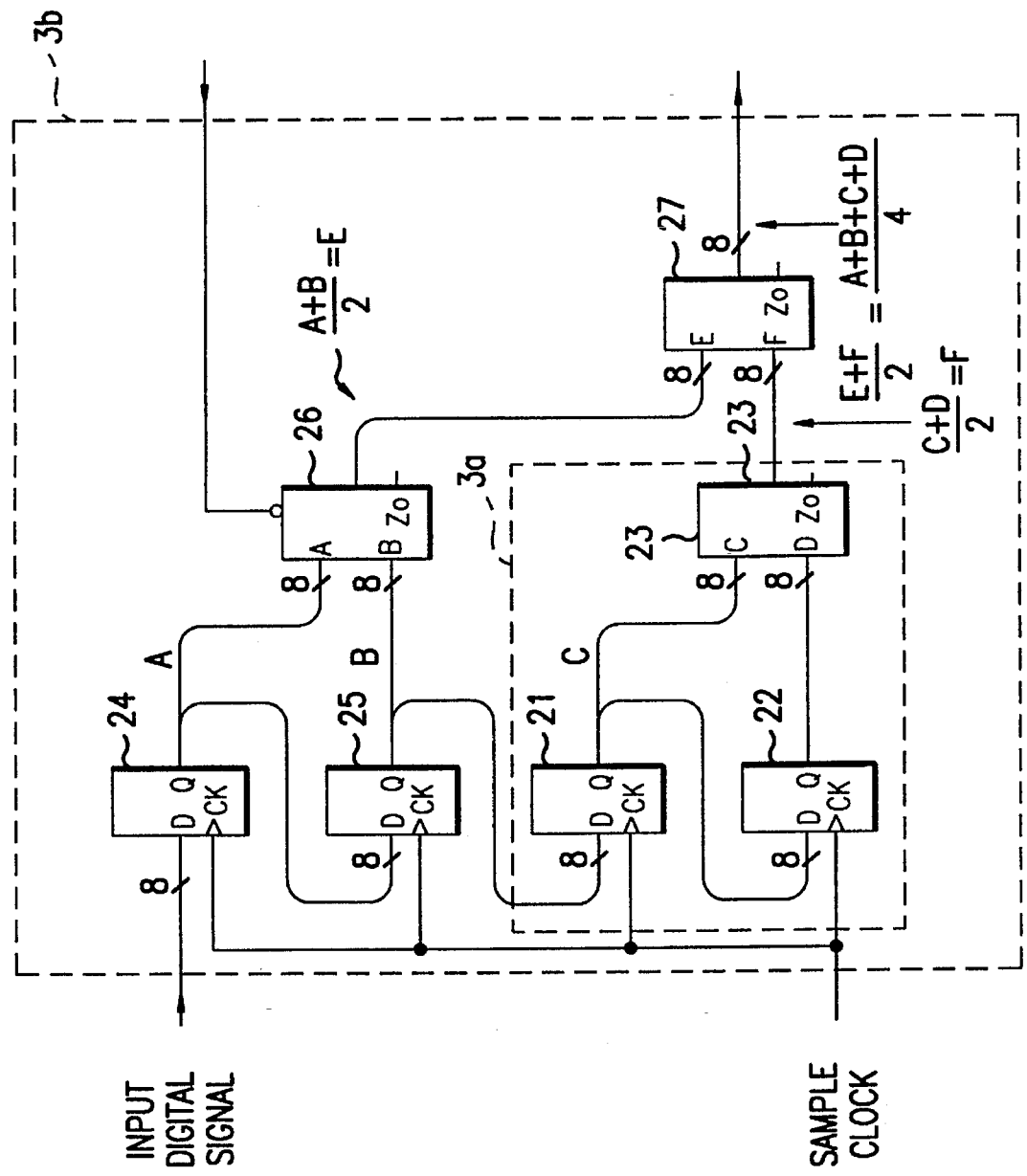
FIG. 4 is a block diagram showing an embodiment of an image signal resolution changing system of the present invention that reduces the resolution in the primary scanning direction by a factor of four.

The averaging process circuit 3 is a circuit that uses hardware logic to continuously output to the next component (i.e., the buffer 4) the average of a plurality of adjacent data (from a plurality of adjacent photoelectric conversion elements) output from the A/D converter 2. An example of this output signal is shown in FIGS. 2A–2D. In addition, block diagrams of possible averaging process circuit 3 arrangements are shown in FIGS. 3 and 4. FIG. 3 shows an averaging process circuit 3a that outputs the average value of two data signals (two pixels) to perform a resolution reduction by a factor of two. FIG. 4 shows an averaging process circuit 3b that outputs the average value of four data signals (four pixels) to perform a resolution reduction by a factor of four.

In FIG. 3, digital signals output from the A/D converter 2 of FIG. 1 are supplied to the D terminal of a D-type flip-flop 21. The Q output of the D-type flip-flop is supplied to the D terminal of another D-type flip-flop 22. Thus, D-type flip-flop 21 together with D-type flip-flop 22 comprise a two-level shift register (flip-flop 21 being the first level and flip-flop 22 being the second level). For this reason, a common sample clock is supplied to both D-type flip-flop 21 and D-type flip-flop 22.

The 8-bit image signal input into D-type flip-flop 21 in response to a clock signal is shifted in parallel into D-type flip-flop 22 in response to the next clock signal. That is, the 8 bits output from the Q output of D-type flip-flop 21 are supplied in parallel to the D terminal of D-type flip-flop 22. Simultaneously with this transfer, the 8-bit image signal previously held in D-type flip-flop 22 is output from the Q output of the D-type flip-flop 22. Because of this relationship, the Q output (8 parallel bits) of the D-type flip-flop 21 and the Q output (8 parallel bits) of the D-type flip-flop 22 become adjacent 8-bit outputs. In other words, each level of the shift register defined by flip-flops 21 and 22 has an 8-bit output, the output of each level being shifted by one sample clock.

The 8 parallel bit Q output of the D-type flip-flop 21 is supplied to the A terminal of a digital addition unit 23. The 8 parallel bit Q output of the D-type flip-flop 22 is supplied to the B terminal of the digital addition unit 23. The output of the digital addition unit 23 is a 9-bit signal including overflow carry, however, the first (or most-significant) 8 bits of this signal become the output of the averaging process circuit 3a. The Z0 terminal of the digital addition unit 23 handles the last bit.

The first 8 bits are the average value of the 8 parallel bit Q output of the D-type flip-flop 21 and the 8 parallel bit Q output of D-type flip-flop 22, as explained below.

For example, taking the 8 parallel bit Q output of the D-type flip-flop 21 to be, expressed in base two:

01100100 (100), and taking the 8 parallel bit Q output of the D-type flip-flop 22 to be, expressed in base two:

11111000 (248), the sum of the two values is:

01100100+11111000=101011100.

Taking the first (MSB) 8 bits of this sum as the averaging process circuit output, the output of the averaging process circuit 3a becomes:

10101110 (174).

In other words, this is the average value of the 8 parallel bit Q output of the D-type flip-flop 21 and the 8 parallel bit Q output of the D-type flip-flop 22. The values in parentheses are the base ten equivalents for reference purposes.

The averaging process circuit 3a shown in FIG. 3 continues to output the average of two adjacent data (output by two adjacent photoelectric conversion elements in the CCD line sensor). By thinning out the necessary data in the CPU 6, resolution changing can be realized without creating the asymmetry caused by losing data (image signals). Using the average of two data corresponds to a resolution that is one-half the maximum resolution.

FIG. 4 shows an averaging process circuit 3b that outputs the average value of four data signals (four pixels). In FIG. 4, the 8-bit digital signal output from the A/D converter 2 of FIG. 1 (see FIG. 2C) is supplied to the D terminal of D-type flip-flop 24. The Q output of the D-type flip-flop 24 is supplied to the D terminal of D-type flip-flop 25. Furthermore, the Q output of the D-type flip-flop 25 is supplied to the D terminal of D-type flip-flop 21. The Q output of the D-type flip-flop 21 is supplied to the D terminal of D-type flip-flop 22.

Together, the D-type flip-flops 24, 25, 21 and 22 comprise a four-level shift register. For this reason, a common sample clock signal is supplied to the D-type flip-flops 24, 25, 21 and 22.

The 8 bits input into each of the D-type flip-flops 24, 25, 21 and 22 shown in FIG. 4 are shifted in parallel in order to perform a four-level shift on 8-bit input digital image signals. The 8 parallel bits at the Q output of the D-type flip-flops 24, 25 and 21 are supplied in parallel to the D terminal of the next D-type flip-flops 25, 21 and 22, respectively. Because of this relationship, the 8 parallel bit Q output of the D-type flip-flops 24, 25, 21 and 22 become adjacent (i.e., parallel) 8-bit outputs. Each level of the shift register defined by D-type flip-flops 24, 25, 21 and 22 has an 8-bit output, the outputs of each level being shifted by one sample clock.

The 8 parallel bit Q output of the D-type flip-flop 24 is supplied to the A terminal of a digital addition unit 26. The 8 parallel bit Q output of the D-type flip-flop 25 is supplied to the B terminal of the digital addition unit 26. The output of this digital addition unit 26 is a 9-bit signal including overflow carry, the first 8 bits of the signal being supplied to the E terminal of digital addition unit 27.

The 8 parallel bit Q output of the D-type flip-flop 21 is supplied to the C terminal of digital addition unit 23. The 8 parallel bit Q output of the D-type flip-flop 22 is supplied to the D terminal of the digital addition unit 23. The output of the digital addition unit 23 is a 9-bit signal including overflow carry, the first 8 bits of the signal being supplied to the F terminal of the digital addition unit 27.

The output of digital addition unit 27 is a 9-bit signal including overflow carry. The first 8 bits of the signal become the output of the averaging process circuit 3b (see FIG. 2D), the Z0 terminal of digital addition unit 27 handling the last bit.

With the circuit shown in FIG. 4, the output of digital addition unit 26 is the average value ((A+B)/2) of the Q output of the D-type flip-flop 24 and the Q output of the D-type flip-flop 25. The output of the digital addition unit 23 is the average value ((C+D)/2) of the Q output of the D-type flip-flop 21 and the Q output of the D-type flip-flop 22. The output of the digital addition unit 27 is the average value ((E+F)/2) of the output of the digital addition unit 26 and the digital addition unit 23. Accordingly, the average value ((A+B+C+D)/4) of the Q outputs of the D-type flip-flops 24, 25, 21 and 22 can be obtained as the output of the digital addition unit 27.

The circuit in FIG. 4 continues to output a signal comprised of a series of "bits" (A', B', C' and D'), each series of "bits" corresponding to an aperture size of the photoelectric sensor elements of the CCD line sensor 1 along the primary scanning direction which has a length which is four times the length of the aperture size of the the individual photoelectric sensor elements (1a, 1b ...) of the CCD line sensor 11, each series of "bits" having a value that is the average of four adjacent outputs of the CCD photoelectric sensor elements. By thinning out the necessary data in the CPU 6, resolution changing can be realized without creating the asymmetry caused by losing data (image signals). Using the average of four data corresponds to a resolution that is one-fourth the maximum resolution. For resolutions having an average of more than four data, high speed processing (real time processing) is also possible by replicating this same circuit.

In addition, by providing a switching circuit for the purpose of resolution selection, it is possible to realize a plurality of resolution changes with the same system. For example, the circuit shown in FIG. 4 contains the averaging process circuit 3a shown in FIG. 3. By controlling enabling and disabling of digital addition unit 26 from the CPU 6, it is possible to switch between averaging four data and averaging only two data.

An embodiment of the present invention has been described above. One disadvantage of the image signal resolution changing system of the present invention is that the size of the circuitry becomes larger as the resolution decreases. Therefore, simultaneous usage of CPU processes (i.e., parallel processing) can be considered. As the resolution decreases, the quantity of data that is to be processed in the same time interval decreases. In other words, even if the processing is slow, the data output performance of the overall system will not change. Therefore, it is possible to realize a low cost system with high total performance by taking into consideration the capabilities of the CPU and the resolution actually needed.

Changing the resolution as detailed above also can be referred to as changing the CCD aperture size in the primary scanning direction. For example, referring to FIG. 2C, the maximum resolution aperture size can be considered to be the width of a single photoelectric conversion element (e.g., element 1a). When the resolution is decreased by a factor of four, as shown in FIG. 2D, the aperture size in the primary scanning direction can be considered to be the width of four photoelectric conversion elements.

The previously described aspect of the present invention also has the characteristic that the CCD aperture size in the primary scanning direction can be controlled as described above in order to avoid the well known Moire phenomenon. The source of the Moire phenomenon is a slight discrepancy between the input image density frequency and the sampling frequency (i.e., resolution) of image reading devices, causing the generation of dark and light patterns, referred to as the Moire phenomenon. With the previously described embodiment of the present invention, it is possible to avoid the occurrence of the Moire phenomenon by changing the aperture size (sampling frequency) in the primary scanning direction.

As described above, with the previously described embodiment of the present invention, the average of adjacent data is output based on the output resolution using a shift register and one or more digital addition units. Consequently, input image data is not lost even when the resolution drops, and it is also possible to perform high speed (real time) resolution changing by realizing processes that use hardware.

Another aspect of the present invention is provided hereafter, in which image resolution reduction in the secondary scanning direction is accomplished.

An image reading device also has what can be referred to as an aperture size in the secondary scanning direction. The aperture size in the secondary scanning direction can thought of (i.e., is related to) the distance (in the secondary scanning direction) of the original document over which the CCD moves while the photoelectric conversion elements are receiving light image input for a single scanline. This distance (the aperture size in the secondary scanning direction) is related to two factors: (1) the velocity of the CCD relative to the original document, also referred to as the stepping motor drive velocity; and (2) the duration of the time period that the photoelectric conversion elements are receiving (and collecting) image light (the amount of light collected being directly related to the value of the analog signal output by each photoelectric conversion element). This time period also is referred to as the integral time of the CCD.

In the prior art device described earlier with respect to FIG. 10, the CCD integral time and the stepping motor velocity are maintained constant. Therefore, the aperture size in the secondary scanning direction is maintained constant. Resolution reduction is made simply by intermittently ignoring data output by the CCD.

In accordance with a second aspect of the invention, the aperture size in the secondary scanning direction is changed in order to cause a change in resolution in the secondary scanning direction. The aperture size in the secondary scanning direction can be changed by changing the stepping motor velocity while maintaining the CCD integral time at previous levels, or by changing the CCD integral time while maintaining the stepping motor a velocity at previous levels.

When the integral time of the CCD line sensor is fixed (i.e., maintained at previous levels), the driving velocity of the stepping motor, which functions as a driving means in the secondary scanning direction, is caused to change. Accordingly, even while keeping the CCD integral time constant, the resolution can be changed because the area of the original document over which the CCD is scanned during the CCD integral time is changed. However, because stepping motor drive systems have a point of resonance, it is not desirable to continuously vary the driving velocity of the stepping motor.

When the driving velocity of the stepping motor is fixed (i.e., maintained at previous levels) the integral time of the CCD line sensor is caused to change. Accordingly, even while keeping the stepping motor velocity constant, the area over which the CCD receives light changes due to the change in the CCD integral time. This causes a change in the size of the aperture in the secondary scanning direction, which changes the resolution. However, if the integral time becomes lengthened too much, a problem arises in that the CCD line sensor may become completely saturated (there is a limit to the amount of light that can be collected by each photoelectric sensor element).

With the present aspect of the invention, in order to assure that the CCD line sensor does not become saturated, and in order to assure that the point of resonance of the stepping motor drive system can be avoided, stepped changes are made in the driving velocity of the stepping motor, and the CCD integral time is varied within a predetermined range in order to provide variable resolutions. The CCD integral times are chosen so that the CCD line sensor does not become completely saturated. The stepping motor velocities are selected so that resonance is avoided. Accordingly, even when the resolution is changed to a low resolution, the pixel input of the entire secondary scanning direction can be reflected in the output data. An explanation of an embodiment is provided hereafter, with reference to the drawings.

Figure 7:
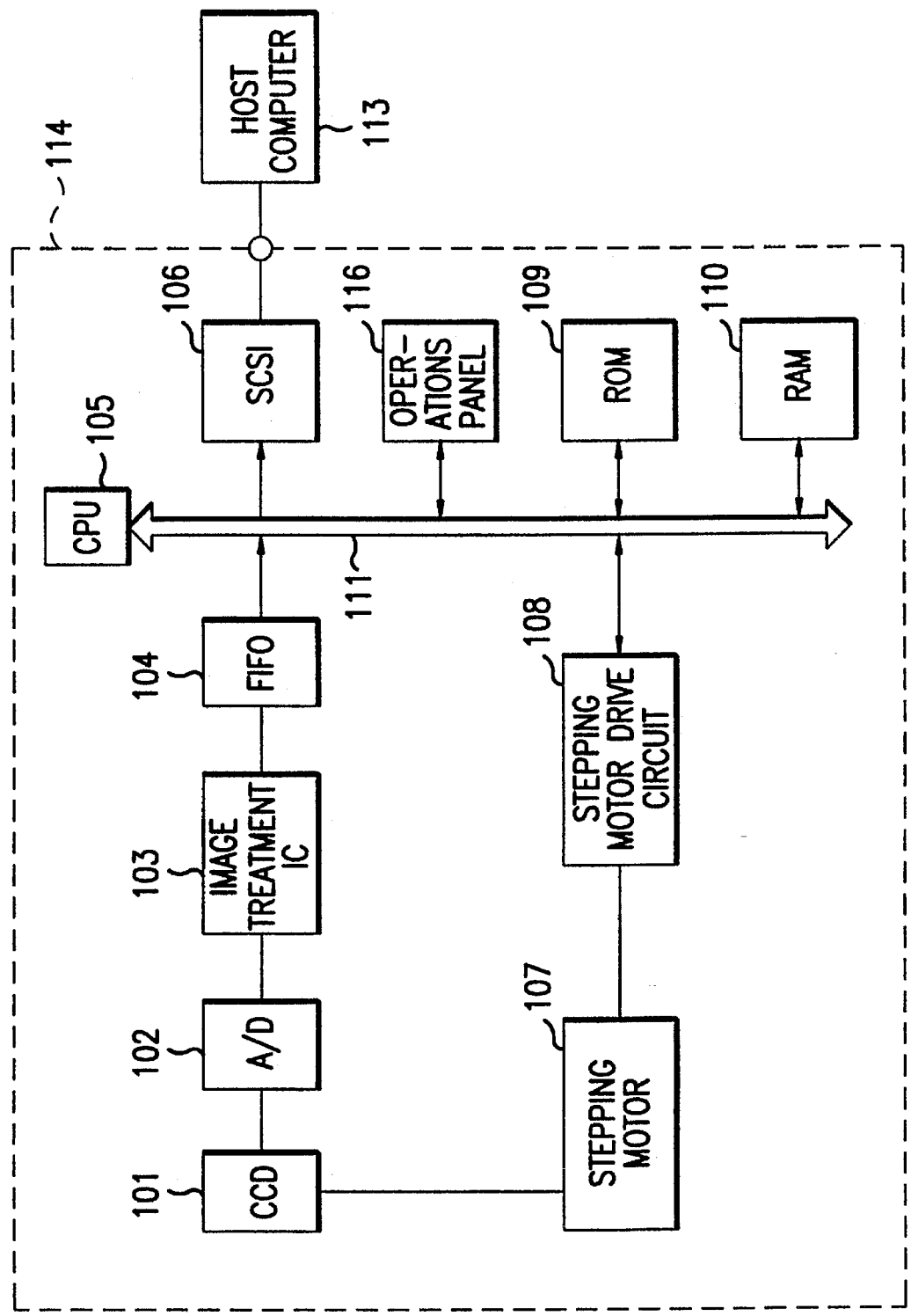
FIG. 7 is a block diagram showing an embodiment of an image scanner according to the present invention that reduces the resolution in the secondary scanning direction.

FIG. 7 is a block diagram of an embodiment of the image scanner according to the present aspect of the invention. In FIG. 7, the input image light lines that are read as they are reflected from or pass through the original document (not shown) are supplied to the CCD line sensor 101, the input image light lines being photoelectrically converted into electronic (analog) signals by means of the CCD line sensor. The analog signals are digitally encoded by means of an A/D converter 102. The CPU 105 stores the digital signals into RAM (Random Access Memory) 110 through the image treatment circuit 103 and the FIFO (first-in, first-out) buffer 104.

Upon the completion of reading-in one line of data, the stepping motor is controlled by the CPU 105, and the CCD line sensor 101 is moved to the next position in the secondary scanning direction. The CPU 105 drivingly controls the stepping motor 107 through the stepping motor drive circuit 108. Subsequently, reading-in of data is accomplished of one line in the primary scanning direction, and movement is accomplished to the next line by means of the stepping motor 107. Reading of the entire original document is accomplished by repeating the above processes.

When utilization is made of all of the data read-in following each single step of the stepping motor 107, when operating at a predetermined motor velocity and CCD integral time, the maximum resolution of the scanner 114 is obtained. With the present embodiment, the maximum resolution of the scanner 114 is 1200 dpi (dots per inch). The read image data is output from the RAM 110 to the external host computer 113 through the bus line 111, and the SCSI circuit 106.

Figure 8:
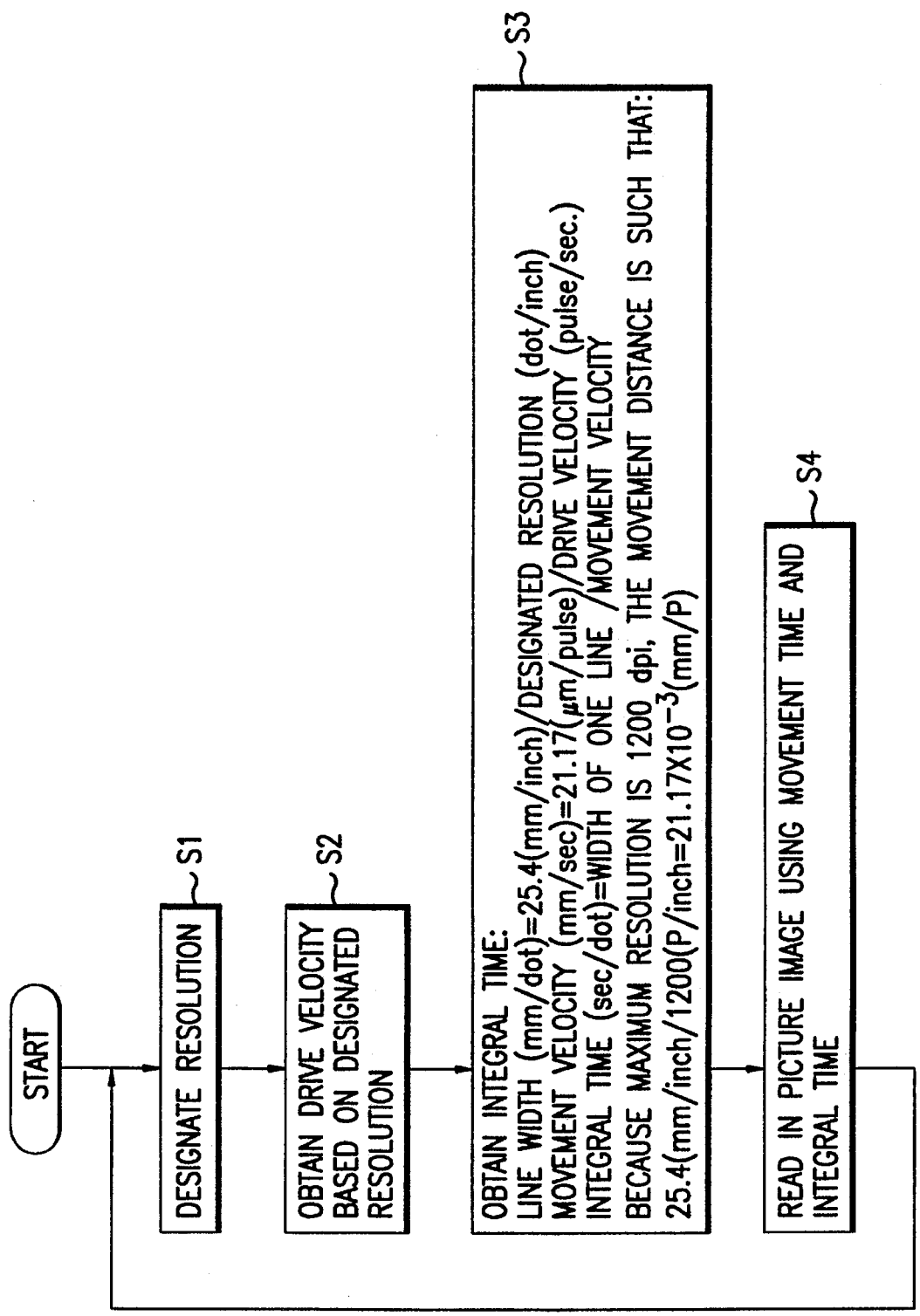
FIG. 8 is a flowchart showing operations of the FIG. 7 embodiment of an image scanner according to the present invention.

When less than the maximum resolution in the secondary scanning direction is obtained (when changing the resolution in the secondary scanning direction), the CPU 105 operates while following the program shown by the flowchart of FIG. 8.

First of all, once the program has started, the designated resolution is obtained (step S1). The resolution can be designated by the user or can be set based upon the requirement of other components in the system (e.g., the printer or the display of the host computer). Next, reference is made to Table 1 (explained hereafter). Based upon the designated resolution, the stepping motor 107 obtains the driving rate (i.e., the stepping motor velocity) for driving the CCD line sensor 101 (step S2). As is well known, it also is possible to drive a support holding the original document while maintaining the CCD line sensor fixed. From the driving velocity obtained by referring to Table 1, and from the degree of resolution designated in step S1, the integral time of the CCD line sensor 101 is obtained (Step S3). The following calculations are accomplished in Step S3 in order to determine the integral time:

(1) The line width of one line (mm/dot)=25.4 (mm/inch)/ designated degree of resolution (dot/inch)

(2) The movement velocity (mm/sec)=$21.17 \times 10^{-3}$ (mm/pulse)*drive velocity (pulse/sec)

(3) The integral time (sec/dot)=the line width of one line (mm/dot) / movement velocity (mm/sec)

In calculating the movement velocity, the quantity $21.17 \times 10^{-3}$ (mm/pulse) was used. This quantity was determined as follows. Since the maximum resolution is 1200 dpi, the distance of movement for each single pulse of the stepping motor 107 is such that:

(4) 25.4 (mm/inch)/1200 (pulse/inch)=$21.17 \times 10^{-3}$ (mm/pulse)

Next, following the accomplishment of the image reading operation (in Step S4), the program returns to Step S1, where it undergoes the next reading operation.

The following table (TABLE 1) is pre-calculated, and is stored into ROM 109.

TABLE 1

| Drive Velocity (pps) | Resolution (dpi) |
| --- | --- |
| 3676.5 | (15–18, 30–37, 60–75) 120–150 |
| 2913.8 | (19–23, 38–47, 76–94) 151–188 |
| 2314.8 | (24–29, 48–59, 95–119) 189–238 |
| 1838.2 | 239–300 |
| 1458.6 | 301–377 |
| 1157.4 | 378–476 |
| 919.1 | 477–600 |
| 729.3 | 601–755 |
| 579.0 | 756–952 |
| 459.6 | 953–1200 |

Figure 9:
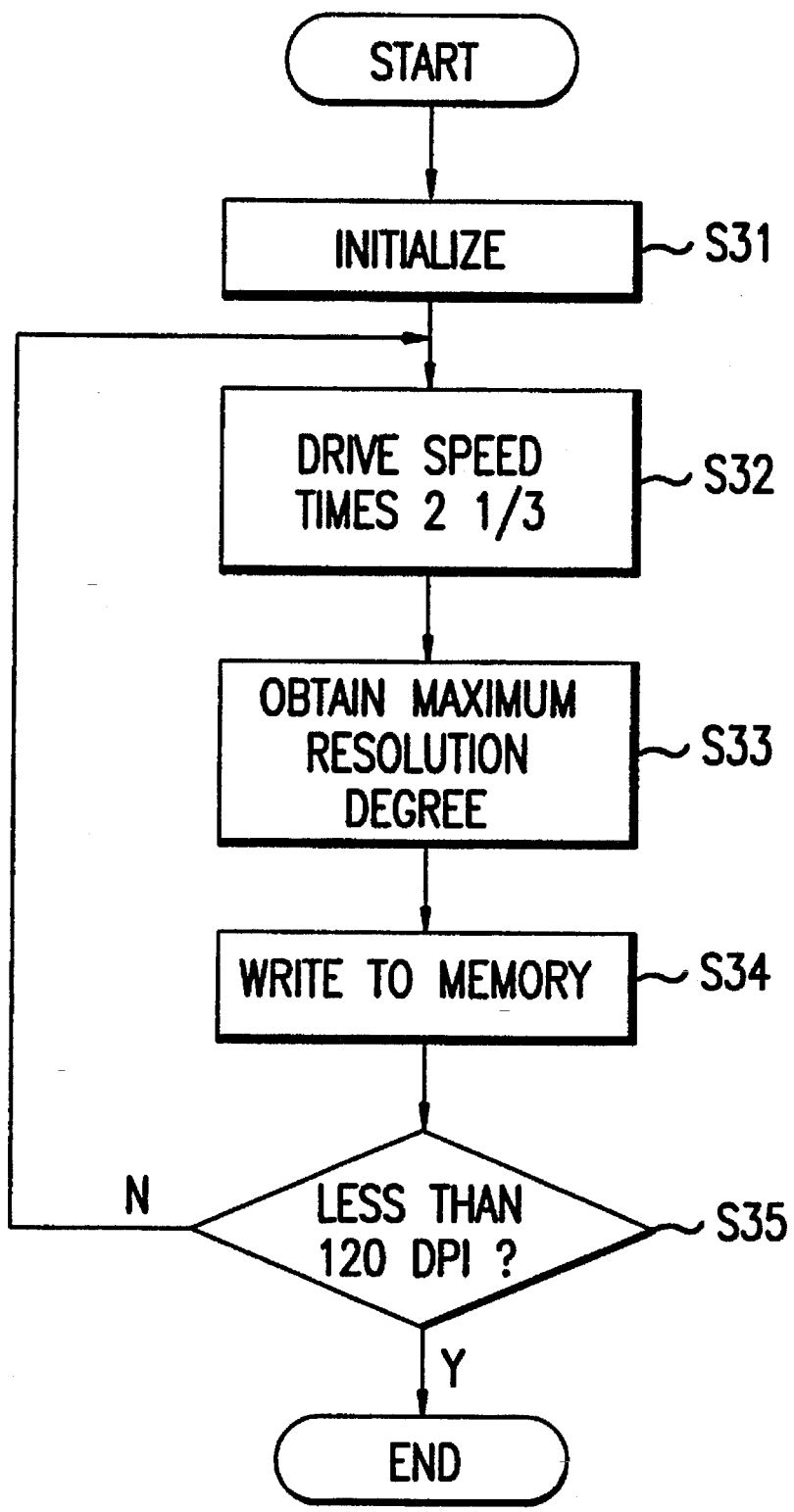
FIG. 9 is a flowchart showing the manner by which parameters are determined in an image scanner according to the present invention.

Table 1 is obtained by following the flowchart of FIG. 9, which can be pre-calculated during the design of the image reading device, and stored in ROM 109. However, at the time of the initial movement of the scanner 114, the values in Table 1 can also be calculated by the CPU 105, and recorded into the RAM 110.

Referring to FIG. 9, once the program has started, an initialization is accomplished for various number changes (in Step S31), the shortest integral time of the CCD line sensor 101 in the present embodiment is 2.176 ms. Furthermore, the driving velocity of the stepping motor 107 when reading-in at a resolution of 1200 dpi is 459.6 pps (=1/2.176 ms). Thus, the maximum, 1200 dpi resolution is obtained by using the predetermined driving velocity of 459.6 pps and the minimum integral time of 2.176 ms.

Next, the minimum resolution that can be obtained while using the drive velocity of 459.6 pps (i.e., the resolution being changed by varying the CCD integral time) is determined. In order to do this, the driving velocity is multiplied by $2^{1/3}$ (step S32). In this instance, $$459.6 \times 2^{1/3} = 579.0 \text{ pps (pulses per second)}$$

$$1200 \div 2^{1/3} = 952 \text{ dpi}$$

is calculated (step 33). From this point, when the resolution (dpi) is 952 dpi or less, there is a drive velocity of 579.0 pps.

Furthermore, because the optimal driving velocity of 459.6 pps can be obtained at a resolution of 953–1200 dpi, this is recorded into Table 1 (step S34).

By repeating steps S32–S34 until reaching a resolution of 120 dpi, the values shown in Table 1 are obtained.

Figure 10:
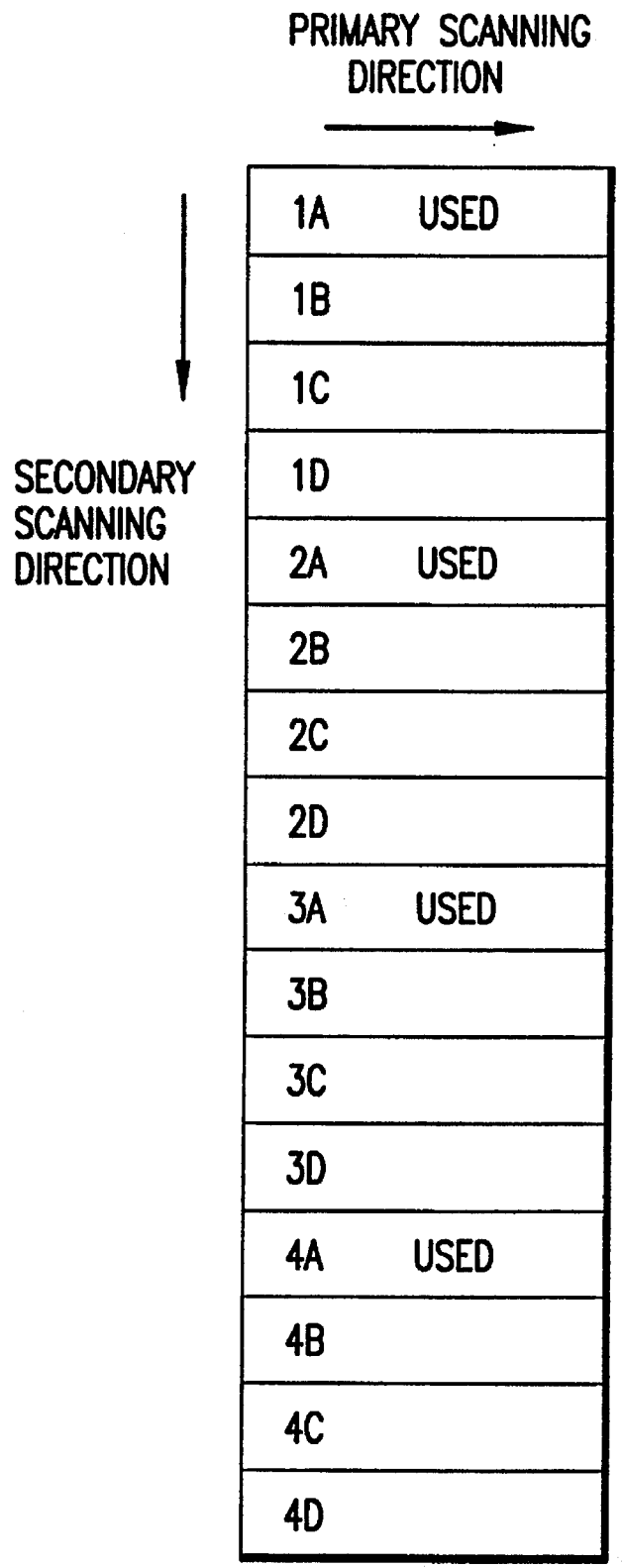
FIG. 10 is a diagram illustrating the conventional thinning process in the secondary scanning direction.

It is not necessary to perform the prior art thinning process of FIG. 10 for resolutions as low as 120 dpi. However, at resolutions below 120 dpi, the FIG. 10 thinning process is used in combination with the present aspect of the invention. This is illustrated in Table 1 by the placement of certain resolutions within parentheses. The resolutions 24–29 dpi, 48–59 dpi and 95–119 dpi are obtained at a drive velocity of 2314.8 pps, however, ⅛ thinning, ¼ thinning, and ½ thinning, respectively, is performed to achieve the low resolutions. Similarly, at a drive velocity of 2913.8 pps, if ½ thinning is accomplished, there will be a resolution of 76–94 dpi; at ¼ thinning, the resolution will be 38–47 dpi; and at ⅛ thinning, a resolution of 19–23 dpi will be achieved. At a drive velocity of 3676.5 pps, if ½ thinning is accomplished, there will be a resolution of 60–75 dpi; if ¼ thinning is accomplished, the resolution will be 30–37 dpi; and if ⅛ thinning is accomplished, the resolution will be 15–18 dpi.

As detailed above, embodiments of the present invention prevent the loss of input image data even when the resolution is decreased in either the primary scanning direction or in the secondary scanning direction. Additionally, the previously described embodiments can be used together in order to reduce the resolution in both the primary and secondary scanning directions.

In summary, a resolution changing device is provided that changes a resolution of the image signals output by the photoelectric sensor device (e.g., the CCD line sensor) by changing the primary scanning direction aperture size, the secondary scanning direction aperture size, or both the primary and the secondary scanning direction aperture sizes of the photoelectric sensor device. The photoelectric sensor device includes a series of photoelectric sensor elements that output image signals based on an amount of light received by the photoelectric sensor elements. The photoelectric sensor device has a primary scanning direction aperture size extending in the primary scanning direction, i.e., the direction in which the photoelectric sensor elements (elements 1a, 1b, . . . of FIG. 2B) extend. The photoelectric sensor device has a secondary scanning direction aperture size extending in a secondary scanning direction (i.e., the direction in which the photoelectric sensor device and the original document move relative to each other), which is substantially perpendicular to the primary scanning direction.

In order to change a resolution of the image signals output by the photoelectric sensor device in the secondary scanning direction, the secondary scanning direction aperture size is changed, for example, by a control device that controls a drive velocity of the drive device that drives the photoelectric sensor device in the secondary scanning direction. Alternatively, the control device can control a duration of an integral time of the photoelectric sensor device during which the photoelectric sensor elements collect light from the original document in order to vary the secondary scanning direction aperture size. Typically, the control device varies both the drive velocity and the integral time in order to vary the resolution in the secondary scanning direction.

A memory can be provided to store predetermined relationships (i.e., Table 1) between resolutions and drive velocities. In such a case, the control device selects one of the drive velocities stored in the memory based upon a selected resolution, and controls the duration of the integral time based on the selected drive velocity and the selected resolution.

In order to change a resolution of the image signals output by the photoelectric sensor device in the primary scanning direction, the primary scanning direction aperture size is changed, for example, by an averaging process circuit that averages the signals output from a plurality of adjacent photoelectric sensor elements in the photoelectric sensor device. The averaging process circuit changes a resolution of the image by a factor of m by averaging the signals output by m adjacent photoelectric sensor elements, wherein m is an integer.

In general, in order to change the primary scanning direction resolution by a factor of m, the averaging process circuit includes an m-level shift register into which an integer number n of bits can be input in parallel, m also being an integer. The n bits are shifted between m-levels of the m-level shift register. The averaging process circuit includes m/2 first digital adding units, each of which adds the bits of two of the m levels, each producing a first level n-bit output signal; m/4 second digital adding units, each of which adds the n-bit first level output signals of two of the first digital adding units, each producing a second level n-bit output signal. Additional levels of the digital adding units are provided and receive the second level output signals to produce additional level n-bit output signals that are provided to further level digital adding units until a single $\log_2 m$-th digital adding unit is provided. The single $\log_2 m$-th digital adding unit adds the n-bit output of two preceding digital adding units, to output a signal, a first n bits of which is a low resolution output image signal.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image reading device comprising:

a photoelectric sensor device having a series of photoelectric sensor elements that output image signals based on an amount of light received by said photoelectric sensor elements, said photodetector sensor elements of said photoelectric sensor device extending in a primary scanning direction, relative movement between said photoelectric sensor elements and an original document extending in a secondary scanning direction, said primary scanning direction being substantially perpendicular to said secondary scanning direction; and a resolution changing device that changes a resolution of the image signals output by said photoelectric sensor device and comprises a control device that controls a duration of an integral time of said photoelectric sensor device during which said photoelectric sensor elements collect light from said original document for a single scanline, in order to vary said resolution along said secondary scanning direction.

2. An image reading device according to claim 1, further comprising a drive device that drives the photoelectric sensor device in the secondary scanning direction relative to said original document, wherein said control device of said resolution changing device controls a drive velocity of said drive device in order to further vary said resolution along said secondary scanning direction.

3. An image reading device according to claim 1, further comprising a memory storing predetermined relationships between resolutions and drive velocities, wherein said control device selects one of the drive velocities stored in said memory based upon a selected resolution and controls said duration of said integral time based on the selected drive velocity and the selected resolution.

4. An image reading device according to claim 2, further comprising a memory storing predetermined relationships between resolutions and drive velocities, wherein said control device selects one of the drive velocities stored in said memory based upon a selected resolution.

5. An image reading device according to claim 1, wherein said resolution changing device further changes a resolution of the image signals output by said photoelectric sensor device by changing an effective aperture size of said photoelectric sensor elements along said primary scanning direction.

6. An image reading device according to claim 5, wherein said resolution changing device includes an averaging process circuit that changes said effective aperture size of said photoelectric sensor elements along said primary scanning direction by averaging the signals output from said photoelectric sensor device representing a plurality of adjacent photoelectric sensor elements.

7. An image reading device according to claim 6, wherein said averaging process circuit changes a resolution of the image by a factor of m by averaging the signals output by m adjacent photoelectric sensor elements, wherein m is an integer.

8. An image reading device according to claim 5, wherein said resolution changing device includes:

a two-level shift register that receives an integer number n of bits into a first register in parallel and shifts said n bits from the first register of said two-level register to a second register of said two-level shift register; and a digital adding unit that adds the bits in said first register with the bits in said second register to output a signal, a highest n bits of said signal being a low resolution output image signal.

9. An image reading device according to claim 5, wherein said resolution changing device includes:

a four-level shift register that receives an integer number n of bits into a first register in parallel and shifts said n bits from the first register of said four-level shift register to a second register of said four-level shift register, then to a third register of said four-level shift register, and then to a fourth register of said four-level shift register;

two first digital adding units, a first one of said first digital adding units adding the bits in two of said four registers to produce a first first-level n bit output signal, a second one of said first digital adding units adding the bits in another two of said four registers to produce a second first-level n bit output signal; and a second digital adding unit that adds the first and second first-level n-bit output signals of said first and second ones of said two first digital adding units to output a signal, a highest n bits of said signal being a low resolution output image signal.

10. An image reading device according to claim 5, wherein said resolution changing device includes:

an m-level shift register that receives an integer number n of bits into a first register in parallel (m being an integer) and shifts said n bits between m registers of said m-level shift register;

m/2 first digital adding units, each first digital adding unit adding the bits of two of said m registers, each first digital adding unit producing a first register n-bit output signal;

m/4 second digital adding units, each second digital adding unit adding the n-bit first register output signals of two of said m/2 first digital adding units, each second digital adding unit producing a second register n-bit output signal;

wherein additional registers of said digital adding units are provided, and each digital adding unit of each additional register receives output signals from two of said digital adding units of an adjacent preceding register to produce additional register n-bit output signals, each additional register output signal being provided to a digital adding unit of a next register until a single digital adding unit is provided on the next register, said single digital adding unit adding the n-bit output of two digital adding units of the adjacent preceding registers to output a signal, a highest n bits of said signal being a low resolution output image signal.

11. An image signal resolution changing system, comprising:

a two-level shift register that receives an integer number n of bits into a first register in parallel and shifts said n bits from the first register of said two-level shift register to a second register of said two-level shift register; and a digital adding unit that adds the bits in said first register with the bits in said second register to output a signal, a highest n bits of said signal being an output image signal.

12. An image reading device comprising:

a plurality of photoelectric sensor means for converting light into output image signals having values based on an amount of light received by said photoelectric sensor means, said photoelectric sensor means arranged in at least one row, said plurality of photoelectric sensor means defining a scanner extending in a primary scanning direction parallel to said at least one row, relative movement between said scanner and an original document extending in a secondary scanning direction, said secondary scanning direction being substantially perpendicular to said primary scanning direction; and resolution changing means for changing a resolution of the image signals output by said scanner and comprising control means for controlling a duration of an integral time of said plurality of photoelectric sensor means during which said photoelectric sensor means collects light from said original document for a single scanline, in order to vary said resolution along said secondary scanning direction.

13. An image reading device according to claim 12, further comprising drive means for driving at least one of the scanner and said original document in the secondary scanning direction, wherein said control means of said resolution changing means further controls a drive velocity of said drive means in order to further vary said resolution along said secondary scanning direction aperture size.

14. An image reading device according to claim 12, wherein said resolution changing means further changes a resolution of the image signals output by said scanner by changing an effective aperture size of said photoelectric sensor means along said primary scanning direction.

15. An image reading device according to claim 14, wherein said resolution changing means includes averaging means for changing said effective aperture size of said photoelectric means along said primary scanning direction by averaging the signals output from said photoelectric sensor means representing a plurality of photoelectric sensor elements.

16. An image reading device according to claim 15, wherein said averaging means changes a resolution of the image by a factor of m by averaging the signals output by m adjacent photoelectric sensor means, wherein m is an integer.

17. An image reading device according to claim 14, wherein said resolution changing means includes at least:

a two-level shift register that receives an integer number n of bits in parallel from said photoelectric sensor means in a first register and shifts said n bits from the first register of said two-level shift register to a second register of said two-level shift register; and a digital adding unit that adds the bits in said first register with the bits in said second register, to output a signal, a highest n bits of said signal being used to produce a low resolution output image signal.

18. A method of changing a resolution of an image signal, said image signal having been output by a photoelectric sensor device having a plurality of photoelectric sensor elements that convert light from an original document, said image signal having a value based on an amount of light received by said photoelectric sensor elements, said photoelectric sensor device extending in a primary scanning direction and a secondary scanning direction, said secondary scanning direction being substantially perpendicular to said primary scanning direction, said method comprising:

changing the resolution of the image signals output by said photoelectric sensor device by controlling a duration of an integral time of said plurality of photoelectric sensor elements during which said photoelectric sensor elements collect light from the original document for a single scanline, in order to vary said resolution along said secondary scanning direction.

19. A method according to claim 18, wherein said resolution along said secondary scanning direction is further changed by:

controlling a drive velocity by which said photoelectric sensor device moves relative to the original document.

20. A method according to claim 18, wherein said resolution of the image signal is further changed by changing an effective aperture size of said photoelectric sensor elements along said primary scanning direction.

21. A method according to claim 20, wherein said effective aperture size of said photoelectric sensor elements along said primary scanning direction is changed by averaging the signals output from said photoelectric sensor elements representing a plurality of photoelectric sensor elements.

22. A method according to claim 21, wherein said averaging includes averaging the signals output by m adjacent photoelectric sensor elements in order to change the resolution of the image signal in the primary scanning direction by a factor of m, wherein m is an integer.

23. A method according to claim 20, wherein said effective aperture size of said photoelectric sensor elements along said primary scanning direction is changed by:

shifting n first bits contained in said image signal from a first level of a two-level shift register to a second level of said two-level shift register while simultaneously placing n second bits contained in said image signal into said first level of said two-level shift register; and adding the n bits in said first level with the n bits in said second level using a digital adding unit to output a signal, a highest n bits of said signal being used to produce a low resolution output image signal.

* * * * *